Patented Nov. 20, 1945

2,389,251

UNITED STATES PATENT OFFICE 2,389,251

PROCESS FOR REMOVING IMPURITIES FROM UNSATURATED HYDROCARBONS BY MEANS OF ORGANOMETALLIC COMPOUNDS

Raymond A. Franz, Wallingford, Pa., assignor to The United Gas Improvement Company, a corporation of Pennsylvania No Drawing. Application November 7, 1944, Serial No. 562,389

17 Claims. (Cl. 260—669)

This application is a continuation-in-part of my copending applications Serial Number 398,405, filed June 17, 1941, and Serial Number 430,958, filed February 14, 1942.

This invention pertains generally to the purification of hydrocarbons and pertains particularly to the purification of certain unsaturated resin-forming hydrocarbons obtained from (1) gas condensates and tar oils produced in the manufacture of artificial gas; (2) cracked petroleum products; (3) coal tar distillates; and (4) synthetic sources such as processes for the manufacture of synthetic styrene and synthetic methylstyrene.

An object of my invention is to provide a new method for the purification of non-acetylenic unsaturated hydrocarbons containing one or more non-cyclic double bonds, and solutions and/or mixtures thereof by treatment with certain organometallic compounds to be hereinafter more particularly described.

Examples of non-acetylenic unsaturated hydrocarbons containing one or more non-cyclic double bonds are olefine and diolefine hydrocarbons. These two classes may be further subdivided into aliphatic, cyclic, and aromatic types. Examples are methylstyrene; styrene; conjugated diolefines such as isoprene, piperylene, butadiene and hexadiene; hexene; pentenes; butenes; propylene and ethylene.

This invention is particularly adapted for the refining of aromatic olefines or aryl olefines, particularly aryl olefines having the styrene structure as a nucleus, such as styrene; alkyl-substituted-styrenes, particularly alkyl-substituted-styrenes in which the alkyl substituents contain less than 5 carbon atoms such as alpha-methylstyrene; beta-methylstyrene; nuclearly monosubstituted methylstyrenes, for example o-methylstyrene, p-methylstyrene, and m-methylstyrene; ethylstyrene; isopropylstyrene; normal-propylstyrene; ethylisopropylstyrene; ethylmethylstyrene; methylisopropylstyrene; dimethyl tert-butylstyrene; and the like.

In the various processes for the manufacture of combustible gas such as oil gas, carburetted water gas or coal gas, considerable quantities of tar are produced, and the gas contains substantial quantities of other more or less readily condensible materials.

These condensates including the light oil obtained upon distillation of the tar are sources for many hydrocarbons such as benzene, toluene, xylene, ethylbenzene, naphthalene, anthracene, indene, styrene, nuclearly substituted methylstyrene, cyclopentadiene, cyclohexene, cyclohexadiene, heptenes, pentenes, butylenes, isoprene, piperylene, butadiene, propylene, ethylene, etc.

With ordinary methods of fractional distillation as now practiced, it is impossible to separate many of the unsaturated compounds in a substantially pure state because of the presence of other materials which apparently are either of similar boiling point or are capable of forming azeotropic mixtures with the desired hydrocarbons.

For example, a typical methylstyrene fraction or a typical styrene fraction obtained by ordinary distillation processes will contain hardly more than 50% or 60% methylstyrene or styrene as the case may be.

Such fractions, as well as those of lower or higher concentrations, are generally suitable for the manufacture of synthetic resins by polymerization except that the resulting resins are very often too inferior with respect to color, color stability, electrical resistance, molding properties, freedom from crazing or blushing, thermal stability, melting point, viscosity, molecular weight, and mechanical strength as to be of any considerable value.

I find that these deficiencies are generally traceable to the presence during polymerization of certain contaminating materials. Although I have not determined the chemical constitution of all of these impurities, experimental evidence indicates that they may be classified in certain specific groups.

For example, typical methylstyrene fractions and typical styrene fractions obtained from light oil were analyzed and found to contain considerable quantities of tolylacetylene, and phenylacetylene respectively.

Typical methylstyrene fractions and typical styrene fractions were analyzed and found to contain substantial quantities of sulfur. The impurities which contain sulfur may be therein in the form of sulfides, mercaptans, thiophenes, and the like.

Similar fractions were found to produce a silver mirror when treated with ammoniacal silver nitrate. This would indicate the presence of such compounds as aldehydes for example formaldehyde, benzaldehyde and methyl benzaldehyde or mixtures of aldehydes, for example a mixture of formaldehyde and benzaldehyde.

Other types of impurities are no doubt present also. Among these types of impurities may be included organic peroxides, organic oxides, organic acids, organic peracids, esters, ketones, amines, nitriles, colored compounds, color-forming compounds, and other reactive classes of compounds.

As indicated above, it is difficult if not impossible to prepare a commercial grade of resin, such as polymethylstyrene, or polystyrene from crude light oil fractions unless at least some of the contaminating impurities are removed.

While the exact influence of these contaminating materials is not known it may be pointed out that they may act (1) as accelerators, resulting in the production of resin of relatively poor quality under the polymerizing conditions which would normally result in the production of a good grade of resin; (2) as inhibitors, reducing the quantity of resin obtained under normal polymerizing conditions; and/or (3) they may take part in the reaction and become an integral part of the resin molecule.

The presence of contaminating impurities in the polymer molecule would undoubtedly weaken it, causing the resin to be less stable to heat and to readily decompose with the formation of color bodies.

The highly reactive nature of many of the hydrocarbons to be treated makes it extremely difficult to remove the contaminating impurities by ordinary methods of purification. For example, such methods as are common practice in the refining industries would remove most, if not all, of the methylstyrene or styrene present.

It seems probable that any material which is sufficiently reactive to be capable of use for the purification of the desired hydrocarbon will also react with it to some extent.

I have found, however, that by the use of an organometallic compound of the character hereinafter described, together with suitable conditions of temperature, pressure, time of contact, concentration, method of application, and the like, practically all of the undesired contaminating materials mentioned may be removed without a considerable loss in the desired hydrocarbon.

By certain organometallic compounds I mean any compound or mixture thereof in which magnesium or beryllium is directly bonded to a carbon atom in the manner shown in the following formula $$R_n M X_{n1}$$

in which X is halogen, namely, Cl, Br, I or F; M is one of a group consisting of magnesium and beryllium; R is any radical having a carbon atom attached to M, which carbon atom has no unsaturation greater than a double bond; and $n$ is an integer less than 3; $n_1$ is 1 when $n$ is 1; and $n_1$ is 0 when $n$ is 2.

Examples of R are alkyl such as methyl, ethyl, propyl, butyl, or amyl; aryl such as phenyl, tolyl, xylyl, naphthyl, phenylmethyl, phenylethyl; alkenyl such as ethenyl, propenyl, butenyl, amenyl; arylalkenyl such as phenyl-substituted ethenyl; alkenylaryl such as ethenyl-substituted phenyl; mono-halogen substituted aryl such as para-bromophenyl, meta-bromophenyl, ortho-bromophenyl, para-chlorophenyl, meta-chlorophenyl, ortho-chlorophenyl, para-bromobenzyl, meta-bromobenzyl, ortho-bromobenzyl; mono-alkoxy-substituted-aryl such as methoxyphenyl known as anisyl, ethoxyphenyl known as phenetyl; furyl; alkyl-alpha-substituted-furyl, such as alpha-methylfuryl.

In the above formula when $n$ is 2 R may be the same or different radicals.

Examples of such compounds are dialkylmagnesiums such as $(CH_3)_2Mg$, diarylmagnesiums such as $(C_6H_5)_2Mg$, alkylmagnesium halides such as $CH_3MgCl$, arylmagnesium halides such as $C_6H_5MgBr$, dialkylberylliums such as $(C_2H_5)_2Be$, diarylberylliums such as $(C_6H_5)_2Be$, alkylberyllium halides for example an alkylberyllium halide in which the alkyl group contains less than three carbon atoms such as $C_2H_5BeCl$, arylberyllium halides such as $C_6H_5BeBr$, etc.

These organometallic compounds may be used in solution or otherwise.

Although any of the above organometallic compounds may be used in the removal of undesirable contaminating materials from the particular unsaturated hydrocarbons to be treated, I have found that the Grignard reagent produces especially satisfactory results. As an example, an ether solution of an alkyl-magnesium halide in which the alkyl group contains less than three carbon atoms such as $CH_3MgI$ or $C_2H_5MgBr$ in concentrations of 1.5 moles per liter of solution is very satisfactory.

A primary purpose of my invention is to reduce the acetylenic content of an unsaturated hydrocarbon to be treated hereunder to such a degree that it no longer interferes with the production of a good quality resin. The amount of acetylenes or mixtures of acetylenes present which have a hydrogen atom attached to a carbon atom of a triple bond may be reduced to any desired degree, or completely removed, depending upon the conditions employed. The same applies to aldehydes.

Another purpose of my invention is to increase the yield of polymer. I have found that the yield of resin can be largely increased by first removing certain undesirable materials by means of my reagent.

Still another purpose of my invention is to remove undesirable color and color-forming compounds from unsaturated hydrocarbons of the type to be treated hereunder by interaction with an organometallic compound of the above character.

Still another purpose of my invention is to improve the odor of unsaturated hydrocarbons of the type to be treated hereunder by interaction with an organometallic compound of the above character.

Still another purpose of my invention is to recover from the organometallic-impurity reaction product any valuable compound by subjecting the complex to further chemical treatment such as hydrolysis with water, or treatment with carbon dioxide followed by hydrolysis, or any other chemical treatment which might lead to the production of a valuable by-product from the reaction-product.

For example, I have found that the residues obtained upon treatment of a methylstyrene fraction yield tolylacetylene when treated with water. In addition the residues if first treated with carbon dioxide have been found to yield tolylpropiolic acid. Corresponding materials may be obtained in the case of styrene fractions. To those skilled in the art it is quite evident that many other valuable compounds could be prepared from the organometallic-reaction complex by the addition of a given chemical compound followed by appropriate chemical methods for isolation of the desired compound or mixture.

While solutions in any suitable solvent of my reagent in any desired strength may be employed, I prefer to use for example a diethyl ether solution containing 1.5 moles of an alkyl- or arylmagnesium halide per liter of solution.

This solution may be used as such by simple addition to the unsaturated hydrocarbon to be treated hereunder or may be first treated so as to remove any portion such as the major portion of the solvent before treating said unsaturated hydrocarbon.

Although I may add my reagent to the unsaturated hydrocarbon to be treated, I prefer to add said unsaturated hydrocarbon to my reagent and then particularly when the major proportion of the solvent has been removed.

I have also found that depending upon the nature of the unsaturated hydrocarbon to be treated, the solvent used in the preparation of my reagent may be replaced by other higher boiling compounds. Such an exchange is illustrated by the substitution of diphenyl ether for the lower boiling diethyl ether.

Any suitable temperature may be employed for the treatment, temperatures in the range of 50° C. to 150° C. being particularly satisfactory. However, it should be kept in mind that certain unsaturated hydrocarbons such as styrene and methylstyrene, particularly when concentrated, polymerize by the application of heat and that when any such hydrocarbon in relatively concentrated form is treated, lower temperatures are indicated for this reason. Therefore, conditions of treatment are preferably such as to avoid polymerizing a large part of the unsaturated hydrocarbon undergoing treatment.

Pressures either at, above, or below atmospheric pressure may be used. Reduced pressures, such as, for example, 40 mm. Hg, however, have been found to produce excellent results. The pressure may be regulated so as to aid in the removal of more volatile reaction products such as methane, ethane, and the like.

The time required for the reaction to go to completion will vary with the nature and quantity of the impurity present in the given unsaturated hydrocarbon fraction. I prefer to react dilute solutions of the unsaturated hydrocarbon undergoing treatment for from 5 minutes to 5 hours. It is advisable to react more concentrated solutions of the unsaturated hydrocarbon under treatment for a relatively limited period of time to prevent losses due to thermal polymerization.

Although any of my reagents may be employed, I prefer to use a Grignard reagent, for example, alkylmagnesium halides such as methyl- or ethylmagnesium chloride or bromide. The choice of the preferred reagent will depend somewhat upon the nature of the impurity and the nature of the unsaturated hydrocarbon fraction to be refined.

The amount of my reagent used may be varied over wide limits depending upon the nature and quantity of impurity present. It is desirable, however, to use an excess over the theoretical amount when the structure of the impurity is known.

Although a batch-run is advisable in case small quantities of materials are to be treated, the process is readily adaptable to continuous treatment by using a countercurrent flow of my reagent such as in a high boiling solvent. The treated unsaturated hydrocarbon may be removed from the residual reagent by distillation. The spent reagent or reaction products may be removed from the process at a convenient point while fresh reagent may be added to another.

The following examples will serve to further illustrate the invention.

*Example 1*

A sample of a crude, dark-yellow, light oil methylstyrene-fraction containing 75% by weight of methylstyrene was polymerized in an atmosphere of nitrogen in a sealed glass bomb by heating for 10 days at 100° C. The resin thus prepared after the evaporation of the volatile solvents had a melting point below 145° C. The yield of resin based upon the overall weight of the sample was 53.6%. The color of the resin was quite yellow (>2.7 Gardner color scale) and was extremely brittle. It could not be molded without cracking.

*Example 2*

A 100 gram sample of the same methylstyrene fraction used in Example 1 was added to 20 cc. of methylmagnesium iodide in diethyl ether. The concentration of this Grignard reagent was 1 cc.=.00103 mole. The mixture was warmed to 80° C. for 1.0 hour and then distilled in vacuo. The distillate of refined methylstyrene solution was water-white in color. The resin prepared from this refined methylstyrene by heating in a sealed bomb in a nitrogen atmosphere for 10 days at 100° C. had a melting point of 162° C. The yield of resin based upon the overall weight of the sample was 61.9%. The color of the molded resin was 1.5 (Gardner color scale). The polymer was also very tough.

*Example 3*

The residue in the pot after the distillation in vacuo as described in Example 2 was treated with an excess of solid $CO_2$ to react with the Grignard-complex. After hydrolysis with 5% $H_2SO_4$, the mixture was extracted with ether. The ether solution after evaporation yielded a small amount of an acidic compound which after one recrystallization from hot water, had a melting point of 106° C. This compound was found to be meta-tolylpropiolic acid.

*Example 4*

A sample of a crude, dark yellow light oil styrene fraction containing 48.6% by weight of styrene was polymerized in an atmosphere of nitrogen in a sealed glass bomb by heating for 10 days at 100° C. The resin thus prepared after the evaporation of the volatile solvents had a melting point of 144° C. The yield of resin based upon the overall weight of the sample was 17.9%. The color of the resin was quite yellow (>10 Gardner color scale) and was extremely brittle. It could not be molded without cracking.

*Example 5*

A 78.5 gram sample of the same styrene fraction used in Example 4 was added to 20 cc. of methylmagnesium iodide in diethyl ether. The concentration of this Grignard reagent was 1 cc.=.0015 mole. The mixture was warmed to 80° C. for 1½ hours and then distilled in vacuo. The distillate of refined styrene solution was water-white in color. The resin prepared from this refined styrene by heating in a sealed bomb in a nitrogen atmosphere for 10 days at 100° C. had a melting point of 207° C. The yield of resin based upon the overall weight of the sample was 28.5%. The color of the molded resin was 1.6 (Gardner color scale), which is practically equivalent to water-white in color. The polymer was also very tough.

*Example 6*

A sample of 56.3% dark yellow crude styrene fraction prepared by the distillation of light oil obtained in the manufacture of oil gas and containing approximately 3.5% of phenylacetylene was polymerized in the same manner as shown in Example 4. The resin had a melting point of 145° C., was quite brittle, and had a color of 2.9 (Gardner scale). The yield of resin based on the overall weight of charge stock was 25.0%.

Example 7

100 grams of the crude styrene fraction used in Example 6 was treated with 34.4 cc. of methylmagnesium iodide in diethyl ether (1 cc. solution=.0015 mole using an atmosphere of nitrogen. The mixture was heated under a reflux condenser at a temperature of 80° C. under a pressure of approximately 100 mm. of mercury, absolute, for a period of 5 hours. At the end of this period the styrene was distilled at a pressure of 40 mm. of mercury, absolute. The distillate was water-white in color and contained 0.1% phenylacetylene. A polymer was prepared as described in Example 4. It had a melting point of 212° C. and was obtained in a yield of 44.6% based on the overall charge stock. Its color was 1.6 (Gardner color scale).

Example 8

A sample of a light yellow colored light oil styrene fraction containing 99.5% styrene and 0.1% phenylacetylene was polymerized in an open vessel for 72 hours at 120° C., followed by 48 hours at 140° C. The polystyrene obtained was cut upon a lathe in the shape of a dumb-bell, the middle section of which had a diameter of 0.75 inch for a distance of 1.25 inches. Two marks 0.625 inch apart were circumscribed upon this test section and the piece was subjected to a temperature of 90° C. for 24 hours under a tension of 9 pounds/square inch. The average elongation of the test piece as measured by a micrometer amounted to 22.7%.

Example 9

A 271 gram portion of the 99.5% styrene fraction used in Example 8 was treated with 50 cc. of methylmagnesium iodide in diethyl ether. (1 cc. of CH₃MgI=0.0015 mole). The mixture was heated at 80° C. under a pressure of 95 mm. of mercury, absolute, for a period of 4 hours. At the end of this period, the mixture was subjected to a vacuum distillation at a pressure of approximately 40 mm. of mercury, absolute. The distillate, which was water-white in color, was polymerized in the same manner as described in Example 8. The elongation test also was carried out in the same manner. The average elongation amounted to 15.6%.

Example 10

A 150 gram sample of 99.5% styrene containing 0.15% phenylacetylene was treated with 12 cc. of ethylmagnesium iodide in diethyl ether solution. (1 cc.=.0015 mole). After distillation of the styrene it was found that the phenylacetylene content was reduced to 0.08%.

Example 11

After the major portion of the diethyl ether had been removed from 12 cc. of ethylmagnesium iodide (1 cc.=.0015 mole) there was added to the mixture 149 g. of 99.5% styrene containing 0.15% phenylacetylene. The mixture was heated for 1¼ hours at 100° C., then distilled at 40 mm. The purified styrene thus obtained contained no phenylacetylene.

Example 12

When a sample of crude 51.9% styrene, containing 1.8% phenylacetylene, prepared from drip oil was polymerized as described in Example 4, a yellow, brittle, resin was obtained. The melting point was 149° C. and it had a color 5.6 (Gardner color scale). The yield of polymer was 10.6% based upon the weight of the charge stock.

Example 13

A 130 cc. portion of ethylmagnesium bromide (1 cc.=.0015 mole) was placed in a flask filled with nitrogen and warmed to remove the diethyl ether. To the residue there was added 200 grams of the same crude styrene fraction used in Example 12. The mixture was gently refluxed for 2 hours at a pressure of 80 mm. of mercury, absolute. It was then distilled at a pressure or 40 mm. of mercury, absolute, the distillate being water-white and entirely free of phenylacetylene. When polymerized as described in Example 4, the distillate yielded a resin melting at 179° C. The yield of polymer based upon the weight of the charge stock was 28.5%., while the color of the polymer was 1.6 (Gardner color scale).

Example 14

A reaction chamber for the continuous treatment of a light yellow colored 99.5% styrene fraction containing 0.21% phenylacetylene was prepared as follows. A glass tube 2 inches in diameter and 17 inches long was sealed at one end to a small inlet tube through which the styrene was permitted to enter. The tube was placed in an upright position and equipped with a condenser and receiver. The reaction tube was filled with ¼" Berl saddles and placed in an oil bath. Into the reaction tube there was placed 100 cc. of purified diphenyl ether and 14 cc. of ethylmagnesium bromide in diethyl ether solution, (1 cc.=.0015 mole). The oil bath was maintained at 100°–105° C., and a pressure of 127 mm. of mercury, absolute, for 40 minutes to remove the diethyl ether. The styrene was permitted to slowly enter the reaction tube at the bottom, then after percolation through the diphenyl ether solution, was distilled from the top of the reaction tube. A 236 cc. of styrene was distilled in this manner. Upon analysis the distillate was found to be free of phenylacetylene. The refined styrene was water-white.

Fractions or solutions of unsaturated hydrocarbons of the character to be treated hereunder of from 1% to 99.9% concentration may be treated by the method described herein to produce water-white refined fractions possessing hardly more than traces, or none, of undesired impurities, such as acetylenes which have a hydrogen atom attached to a carbon atom of a triple bond, aldehydes, color, and color-forming bodies. Fractions of at least 30% concentration are preferred. At least 50% concentration is particularly preferred.

While the boiling range of extremely dilute fractions may cover a fairly wide range, boiling ranges within approximately a 50° C. spread and more especially within approximately a 25° C. spread are preferred.

Thus, for example, when a light oil methylstyrene fraction is to be treated a boiling range between approximately 57° C. and 72° C. at 20 mm. (160° C. and 180° C. at 760 mm.), and more especially within approximately 60° C. and 68° C. at 20 mm. (165° C. and 175° C. at 760 mm.) is preferred. Narrower fractions such as between approximately 61° C. and 68° C. at 20 mm. (167° C. and 173° C. at 760 mm.) are particularly desirable. With styrene a boiling range within approximately 30° C. to 59° C. at 20 mm. (125° C. to 165° C. at 760 mm.) and more especially within approximately 36° C. and 52° C. at 20 mm. (135° C. and 155° C. at 760 mm.) are preferred with a boiling range within 42° C. to 48° C. at 20 mm. (140° C. to 150° C. at 760 mm.) even more desirable.

Extremely dilute fractions may be employed in some instances, such as when it is desired to react the treated unsaturated hydrocarbon with some other compound in which case my treatment serves to purify such unsaturated hydrocarbon for reaction purposes.

The term "non-acetylenic" as used in the specification and the claims denotes the absence of the acetylenic triple bond.

The term "non-cyclic" as applied to a double bond denotes that neither carbon atom joined by the double bond is contained within a ring.

While specific procedures have been outlined, it is to be understood that these are by way of illustration. Therefore, changes, omissions, additions, substitutions and/or modifications may be made within the scope of the claims without departing from the spirit of the invention.

I claim:

1. A process for refining an unsaturated resin-forming hydrocarbon selected from the group consisting of olefines and diolefines and associated in admixture with at least one acetylenic compound having a hydrogen atom attached to a carbon atom of a triple bond and at least one aldehyde comprising contacting said admixture with an organometallic compound having the formula $R_nMX_{n1}$ in which X is halogen, M is one of a group consisting of beryllium and magnesium, R is any radical having a carbon atom attached to M which carbon atom has no unsaturation greater than a double bond, $n$ is an integer less than 3, $n1$ is 1 when $n$ is 1, and $n1$ is 0 when $n$ is 2; to selectively react said acetylenic compound and said aldehyde as differentiated from a reaction of a large proportion of said unsaturated hydrocarbon, and recovering said unsaturated hydrocarbon in a form less contaminated with said acetylenic compound and said aldehyde.

2. A process for refining an unsaturated resin-forming hydrocarbon selected from the group consisting of olefines and diolefines and associated in admixture with at least one acetylenic compound having a hydrogen atom attached to a carbon atom of a triple bond comprising contacting said admixture with an organometallic compound having the formula $R_nMX_{n1}$ in which X is halogen, M is one of a group consisting of beryllium and magnesium, R is any radical having a carbon atom attached to M which carbon atom has no unsaturation greater than a double bond, $n$ is an integer less than 3, $n1$ is 1 when $n$ is 1, and $n1$ is 0 when $n$ is 2; to selectively react said acetylenic compound as differentiated from a reaction of a large proportion of said unsaturated hydrocarbon, and recovering said unsaturated hydrocarbon in a form less contaminated with said acetylenic compound.

3. A process for refining an unsaturated resin-forming hydrocarbon selected from the group consisting of olefines and diolefines and associated in admixture with at least one aldehyde comprising contacting said mixture with an organometallic compound having the formula $R_nMX_{n1}$ in which X is halogen, M is one of a group consisting of beryllium and magnesium, R is any radical having a carbon atom attached to M which carbon atom has no unsaturation greater than a double bond, $n$ is an integer less than 3, $n1$ is 1 when $n$ is 1, and $n1$ is 0 when $n$ is 2; to selectively react said aldehyde as differentiated from a reaction of a large proportion of said unsaturated hydrocarbon, and recovering said unsaturated hydrocarbon in a form less contaminated with said aldehyde.

4. A process for refining styrene in admixture with impurity including phenylacetylene comprising contacting said admixture with an organometallic compound having the formula $R_nMX_{n1}$ in which X is halogen, M is one of a group consisting of beryllium and magnesium, R is any radical having a carbon atom attached to M which carbon atom has no unsaturation greater than a double bond, $n$ is an integer less than 3, $n1$ is 1 when $n$ is 1, and $n1$ is 0 when $n$ is 2; to react said phenylacetylene, and recovering styrene less contaminated with phenylacetylene.

5. A process for purifying a light oil styrene fraction from phenylacetylene contained therein which comprises treating said fraction with an alkylmagnesium halide to react said phenylacetylene, and recovering said fraction in a form less contaminated with phenylacetylene.

6. A process for improving a light oil styrene fraction containing phenylacetylene contamination comprising contacting said contaminated fraction with an arylmagnesium halide to convert said phenylacetylene to a form more readily separable from said fraction, and recovering said fraction in purified form with respect to said contamination.

7. A process for refining a light oil styrene fraction with respect to phenylacetylene contained as an impurity therein comprising contacting said fraction with an alkylmagnesium halide in which the alkyl group contains less than 3 carbon atoms to react phenylacetylene with the formation of a compound more readily separable from styrene, and recovering styrene associated with less phenylacetylene impurity.

8. A process for refining a light oil styrene fraction containing phenylacetylene as an impurity comprising treating said fraction with an alkylmagnesium halide in the presence of an ether to react said impurity, and recovering said fraction from the reaction mass in purified form.

9. A process for refining a light oil styrene fraction containing phenylacetylene as an impurity comprising contacting said fraction with an alkylmagnesium halide in the presence of a diphenyl ether to react said impurity and recovering said fraction from the reaction mass in a form less contaminated with phenylacetylene.

10. In a process for refining methylstyrene in admixture with impurity including tolylacetylene comprising contacting said mixture with an organometallic compound having the formula

in which X is halogen, M is one of a group consisting of beryllium and magnesium, R is any radical having a carbon atom attached to M which carbon atom has no unsaturation greater than a double bond, $n$ is an integer less than 3, $n1$ is 1 when $n$ is 1, and $n1$ is 0 when $n$ is 2; to react said tolylacetylene and recovering methylstyrene less contaminated with tolylacetylene.

11. A process for purifying a light oil methylstyrene fraction from tolylacetylene contained therein which comprises treating said fraction with an alkylmagnesium halide to react said tolylacetylene, and recovering said fraction in a form less contaminated with tolylacetylene.

12. A process for improving a light oil methylstyrene fraction containing tolylacetylene contamination comprising contacting said contaminated fraction with an aryl magnesium halide to convert said tolylacetylene to a form more readily separable from said fraction, and recovering said fraction in purified form with respect to said contamination.

13. A process for refining a light oil methylstyrene fraction contaminated with tolylacetylene comprising treating said fraction with an alkylmagnesium halide in which the alkyl group contains less than three carbon atoms to react said tolylacetylene, and recovering said fraction from the reaction mass with a lower tolylacetylene content.

14. A process for refining a light oil methylstyrene fraction containing tolylacetylene as an impurity comprising treating said fraction with an alkylmagnesium halide in the presence of an ether to react said impurity, and recovering said fraction from the reaction mass in purified form.

15. A process for refining a light oil methylstyrene fraction containing tolylacetylene as an impurity comprising contacting said fraction with an alkylmagnesium halide in the presence of a diphenyl ether to react said impurity and recovering said fraction from the reaction mass in a form less contaminated with tolylacetylene.

16. A process for refining a non-acetylenic unsaturated hydrocarbon having at least one non-cyclic double bond and associated in a mixture with at least one acetylenic compound having a hydrogen atom attached to a carbon atom of a triple bond comprising contacting said mixture with an alkylberyllium halide to react said impurity, and recovering said unsaturated hydrocarbon in less contaminated form.

17. A process for refining a non-acetylenic unsaturated hydrocarbon having at least one non-cyclic double bond and associated in a mixture with at least one acetylenic compound having a hydrogen atom attached to a carbon atom of a triple bond comprising contacting said mixture with a Grignard reagent under temperature conditions from approximately 50° C. to approximately 150° C. and at subatmospheric pressure to react said acetylenic compound, and recovering said unsaturated hydrocarbon less contaminated with said acetylenic compound.

RAYMOND A. FRANZ.